US007992042B2

(12) United States Patent
Todoroki et al.

(10) Patent No.: US 7,992,042 B2
(45) Date of Patent: Aug. 2, 2011

(54) DEBUG SUPPORT DEVICE, AND PROGRAM FOR DIRECTING COMPUTER TO PERFORM DEBUGGING METHOD

(75) Inventors: Akinari Todoroki, Okaya (JP); Katsuya Tanaka, Hokkilo (JP)

(73) Assignee: Seiko Epson Corporation, Tokyo (JP)

( * ) Notice: Subject to any disclaimer, the term of this patent is extended or adjusted under 35 U.S.C. 154(b) by 386 days.

(21) Appl. No.: 11/651,549

(22) Filed: Jan. 10, 2007

(65) Prior Publication Data

US 2007/0180322 A1     Aug. 2, 2007

(30) Foreign Application Priority Data

Jan. 11, 2006  (JP) ................................. 2006-003529

(51) Int. Cl.
*G09F 11/00* (2006.01)
(52) U.S. Cl. .............................. 714/34; 714/35; 712/227
(58) Field of Classification Search .................... 714/34, 714/35; 712/227
See application file for complete search history.

(56) References Cited

U.S. PATENT DOCUMENTS

| | | | | |
|---|---|---|---|---|
| 5,721,931 | A * | 2/1998 | Gephardt et al. | 710/260 |
| 5,758,169 | A * | 5/1998 | Nizar et al. | 710/266 |
| 6,016,555 | A * | 1/2000 | Deao et al. | 714/35 |
| 6,112,298 | A * | 8/2000 | Deao et al. | 712/227 |
| 6,418,543 | B1 * | 7/2002 | Goli et al. | 714/38 |
| 6,516,460 | B1 * | 2/2003 | Merks et al. | 717/124 |
| 6,718,294 | B1 * | 4/2004 | Bortfeld | 703/20 |
| 6,857,084 | B1 * | 2/2005 | Giles | 714/35 |
| 6,859,892 | B2 * | 2/2005 | Bolding et al. | 714/34 |
| 7,100,033 | B2 * | 8/2006 | Roth et al. | 713/1 |
| 7,222,264 | B2 * | 5/2007 | Muratori et al. | 714/35 |
| 7,356,630 | B2 * | 4/2008 | Hoshina et al. | 710/220 |
| 7,363,544 | B2 * | 4/2008 | Day et al. | 714/34 |
| 7,406,688 | B2 * | 7/2008 | Shibayama et al. | 718/102 |
| 7,444,547 | B2 * | 10/2008 | Abou-Emara et al. | 714/38.1 |
| 2003/0014736 | A1 * | 1/2003 | Nguyen et al. | 717/129 |
| 2004/0083072 | A1 | 4/2004 | Roth et al. | |
| 2004/0205747 | A1 | 10/2004 | Bernstein et al. | |
| 2005/0246688 | A1 | 11/2005 | Gupta et al. | |
| 2006/0150007 | A1 * | 7/2006 | Gostynski et al. | 714/12 |
| 2007/0168592 | A1 * | 7/2007 | Todoroki et al. | 710/200 |

(Continued)

FOREIGN PATENT DOCUMENTS

JP     A 05-313946     11/1993

(Continued)

OTHER PUBLICATIONS

Mar. 25, 2010 Supplementary Search Report and European Search Opinion for European Patent Application No. 07706614.0.

*Primary Examiner* — Robert W Beausoliel, Jr.
*Assistant Examiner* — Elmira Mehrmanesh
(74) *Attorney, Agent, or Firm* — Oliff & Berridge, PLC

(57) ABSTRACT

A debug support device for debugging a multiprocessor configured by a plurality of unit processors a unit processor stop section realized by a plurality of the unit processors executing a program for each of the threads, and any one of the plurality of unit processors performing a process of stopping a unit processor executing a thread in which exception handling occurs together with unit processors executing other threads when the exception handling of software occurs by a break point of a part of the plurality of threads; and a debugging execution section for performing a debugging process of detecting information about a state of the plurality of unit processors stopped by the unit processor stop section.

7 Claims, 6 Drawing Sheets

U.S. PATENT DOCUMENTS

2008/0140896 A1 * 6/2008 Todoroki et al. .............. 710/264

FOREIGN PATENT DOCUMENTS

| | | |
|---|---|---|
| JP | A 06-332747 | 12/1994 |
| JP | A-08-305607 | 11/1996 |
| JP | A-09-106361 | 4/1997 |
| JP | A-10-333938 | 12/1998 |
| JP | A-2002-024196 | 1/2002 |
| JP | A-2003-223339 | 8/2003 |
| JP | A-2004-318658 | 11/2004 |
| JP | A-2005-122375 | 5/2005 |
| JP | A-2006-164001 | 6/2006 |

* cited by examiner

DEBUG SUPPORT DEVICE, AND PROGRAM FOR DIRECTING COMPUTER TO PERFORM DEBUGGING METHOD

The entire disclosure of Japanese Patent Application No. 2006-003529, filed Jan. 11, 2006 is expressly incorporated by reference herein.

BACKGROUND

1. Technical Field

The present invention relates to a debug support device for debugging a program, and a program for directing a computer to perform a debugging process, and more specifically to a debug support device for debugging a program executed by a processor in multiprocessor form realized by a plurality of processors, and a program for directing a computer to perform a debugging method.

2. Related Art

Recently, a tool referred to as a debugger is used in developing software of a computer. The debugger has the function of directing a computer to interrupt a program, set a break point, and perform a single step to virtually operate a processor and memory of a computer. The debugger can be an online debugger implemented by software only and an ICE (in-circuit emulator) implemented by a combination with hardware. The ICE has advanced functions but expensive. The online debugger is less expensive than the ICE, but has no equivalent functions.

The debugger sets the function of suspending a program called a "break point". When the break point is performed, the debugger is activated. When the debugger is activated, a register, memory, I/O of a processor can be referenced and changed.

Recently, a processor capable of concurrently operating a plurality of processors by combining the plurality of processors has been developed. The processor can be a multithread processor and a multiprocessor. In this specification, a processor obtained by combining a plurality of processors such as a multithread processor, a multiprocessor, etc. is generally referred to as a multiprocessor system.

For supporting a debugging operation of a multiprocessor system, there is a technique of grasping the state of the programs of all processors executed by a multiprocessor system by stopping the processors other than a processor in which a break point occurs. The conventional technique can be, for example, JP-A-5-313946 (hereinafter referred to as patent document 1).

In the patent document 1, a system clock is stopped when a processor to be debugged reaches a break point and a stop signal is issued. At this time, the operations of all components of the entire system are simultaneously stopped, and the contents of the memory and register of all processors and the contents of the registers of other hardware modules when the operations are stopped are read. In the patent document 1, the operation states of not only a specific processor but also other hardware modules can be observed when a break point occurs.

However, in the invention according to the patent document 1, since a break point instruction raises an exception condition and the clock control unit stops the system clock, other processors cannot be stopped in one process. Moreover, the processor is stopped, for example, at the separation of a machine cycle.

Therefore, in the field of supporting the debugging of a multiprocessor system, it is desired to develop a technique of more efficiently matching the stop timing between a processor in which a break point occurs and other processors.

SUMMARY

The present invention has been developed to solve the above-mentioned problems and aims at providing: a debug support device appropriate for a multiprocessor system capable of stopping a plurality of processors in a multiprocessor system substantially simultaneously and efficiently, and grasping the state of each processor when a break point occurs; and a program for directing a computer to perform a debugging method.

To solve the above-mentioned problem, the debug support device according to the present invention is a debug support device for debugging a multiprocessor configured by a plurality of unit processors, and includes: a unit processor stop section realized by a plurality of the unit processors executing a program for each of the threads, and any one of the plurality of unit processors performing a process of stopping a unit processor executing a thread in which exception handling occurs together with unit processors executing other threads when the exception handling of software occurs by a break point of a part of the plurality of threads; and a debugging execution section for performing a debugging process of detecting information about the state of the plurality of stopped unit processors.

According to the invention, when exception handling of software occurs by a break point of a part of thread in a plurality of threads performed by a plurality of unit processors, the unit processor that processes the thread in which the exception handling occurs can be stopped together with the unit processors that process other threads. Then, the debugging process of detecting the information about the states of the plurality of stopped unit processors can be performed.

Therefore, a plurality of unit processors in the multiprocessor can be substantially simultaneously stopped when the exception handling occurs, and the information about each unit processor can be detected. The invention can provide a debug support device capable of substantially simultaneously and efficiently stopping a plurality of processors in the multiprocessor system, and grasping the state of each unit processor when a break point occurs.

The debug support device according to the present invention features the debugging execution section which performs the debugging process in the unit processor executing the thread in which the exception handling occurs.

According to the invention, the process of selecting a unit processor assigned to the debugging process can be omitted, and the debugger can be activated immediately after an occurrence of an exception condition.

The debug support device according to the present invention also features a debugging execution section performing the debugging process in the other unit processors than the unit processor executing the thread in which the exception handling occurs.

According to the invention, an appropriate unit processor in performing a debugging process can be selected and the debugging process can be performed. By selecting an app unit processor, the efficiency of the debugging of a multiprocessor can be furthermore enhanced.

The debug support device according to the present invention also features a unit processor selection section for selecting a unit processor for use in performing a debugging process by the debugging execution section, and the unit processor selection section selecting a unit processor not being used in thread processing.

According to the invention, the number of threads to be stopped by debugging can be reduced, and the efficiency of the debugging of a multiprocessor can be enhanced.

The program for directing a computer to execute the debugging method of the present invention features a program for directing a computer to execute a debugging method applied to a debug support device for debugging a multiprocessor configured by a plurality of unit processors, and includes: a unit processor stopping step of making any one of the plurality of unit processors perform the process of stopping a unit processor executing a thread in which exception handling occurs together with unit processors executing other threads when the exception handling of software occurs by a break point in the program being executed for each of the threads by the plurality of unit processor; and a debugging execution step of performing a debugging process of detecting information about a state of the plurality of unit processors stopped by the unit processor stopping step.

According to the above-mentioned invention, when exception handling of software occurs by a break point of a part of threads of application threads performed by a plurality of unit processors, the unit processor executing the thread for which the exception handling occurs can be stopped with the unit processors executing other threads. Then, the debugging process of detecting the information about the states of the plurality of stopped unit processors can be performed.

Therefore, when the exception handling occurs, a plurality of unit processors in the multiprocessor are stopped substantially simultaneously in one process, and the information about each unit processor can be detected. The present invention can provide a program for directing a computer to perform the debug supporting method of correctly grasping the state of each processor when a break point occurs.

DESCRIPTION OF THE PREFERRED EMBODIMENTS

The debug support device and a program for directing a computer to perform the debugging method according to the first and second modes for embodying the present invention are explained below by referring to the attached drawings.
(First Mode for Embodying the Present Invention)

Figure 1:
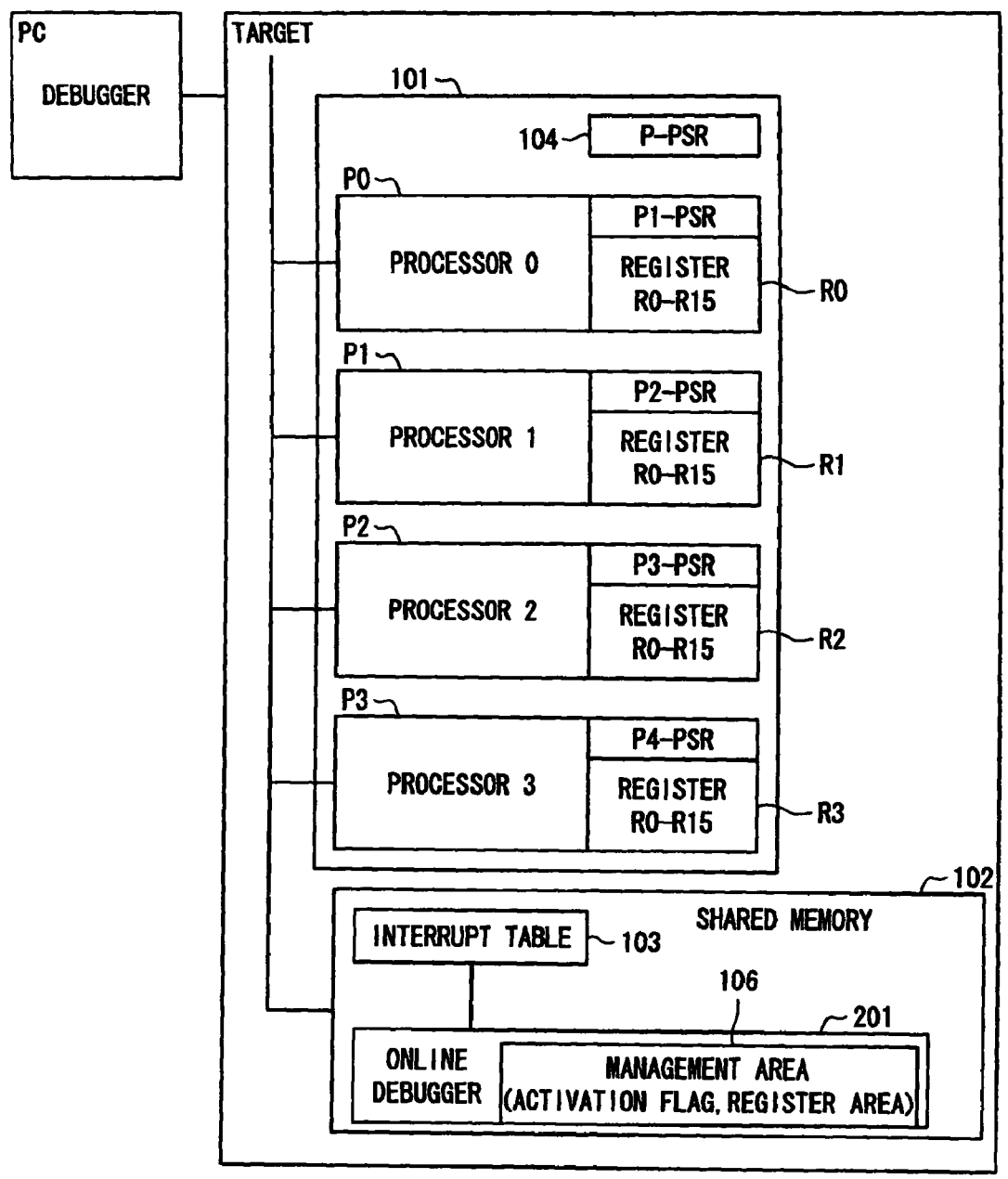
FIG. 1 is a block diagram for explanation of the debug support device according to the first and second modes for embodying the present invention.

FIG. 1 is a view commonly used in the first and second modes for embodying the present invention, and a block diagram for explanation of the debug support device. The debug support device shown in FIG. 1 is applied to a multiprocessor system formed by a plurality of unit processors.

The multiprocessor system described in the first mode for embodying the present invention is provided with a plurality of processors (referred to as unit processors because they configure a multiprocessor system) P0 to P3. The unit processors P0 to P3 configure a multiprocessor as a combination sharing shared memory 102. The portion of only the processor of the multiprocessor is shown in FIG. 1 as a processor unit 101.

The unit processors P0 to P3 have respective status registers (PSR). The PSR is a register storing the status of the unit processors P0 to P3. The status refers to the information about the state of a unit processor, for example, the possibility of the interrupt of a unit processor, the state of an occurrence or an overflow in a unit processor, etc.

A program executed by a multiprocessor is divided into a unit of a thread, and the unit processors P0 to P3 execute a program for the respectively threads. The description of a thread also refers to the unit of a program, and a program in a thread unit in the present specification.

The debug support device according to the first mode for embodying the present invention is provided with an online debugger 201 for stopping a unit processor executing a thread in which exception handling occurs together with unit processors executing other threads when the exception handling of software occurs by a break point in a part of thread of a plurality of threads executed by unit processor P3.

The online debugger 201 is software of HYPERLINK http://e-words.jp/w/ E382BDE38395E38388E382A6E382A7E382A2.html that supports finding and correcting a bug in a program using a processor unit 101 as a target, and is stored in the shared memory 102. In instruction to the online debugger 201 is executed by software not shown in the attached drawings using a PC as a debugger.

The debug support device according to the first mode for embodying the present invention can be configured only by the online debugger 201 and the software of the PC. Therefore, the debug support device according to the first mode for embodying the present invention can be produced at a lower cost than the debugger using the debug support device.

A forcible execution stop code (break point instruction) to forcibly stopping the execution of a thread is inserted into the online debugger 201. The process of a thread by the unit processors P0 to P3 is stopped by the online debugger 201 when the break point instruction is executed. In this specification, the stop of the execution of a thread is also referred to as exception handling of software.

The stop of execution of a thread is performed by an interrupt to the unit processors P0 to P3. In the first mode for embodying the present invention, an interrupt table 103 used in an interrupt is stored in the shared memory 102.

The interrupt table 103 is a table for management of interrupt processing in accordance with an interrupt order. An interrupt control unit, not shown in the attached drawings, of a multiprocessor is added to the interrupt table 103 in the interrupt order assigned to the interrupt requested on the basis of the interrupt processing and the priority of the thread being processed. The interrupt table 103 is also used in other interrupts to the multiprocessor.

Figure 2:
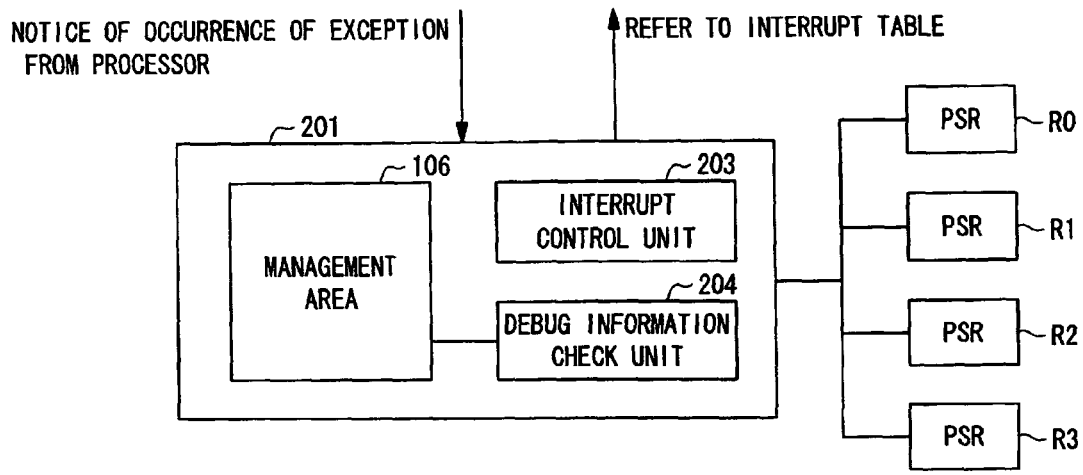
FIG. 2 is a block diagram showing the functions of the online debugger shown in FIG. 1.

FIG. 2 is a block diagram showing the functions of the online debugger 201. The online debugger 201 is provided with an interrupt control unit 203 and a debug information check unit 204. The interrupt control unit 203 is a program for performing interrupt processing on the unit processors P0 to P3 by referring to the interrupt table 103. In at least one of the stopped unit processors P0 to P3, the debug information check unit 204 detects information (hereinafter referred to as debug information) about the status of a plurality of stopped unit processors. Such an online debugger functions as a unit processor stop section and a debugging execution section in the first mode for embodying the present invention.

The debugging is executed by the debug information check unit 204 accessing status registers R0 to R3 and storing debug information in the shared memory 102. To execute the debugging, the debug support device according to the first mode for embodying the present invention is provided in the shared memory 102 with a management area 106 to be managed by the online debugger 201. The management area 106 in the shared memory 102 can be reference by any of the unit processors P0 to P3.

In the management area 106, there are an activation flag area to which an activation flag indicating the status of the online debugger 201 is written, and a register area to which the information about the detected unit processors P0 to P3 is written.

Figure 3:
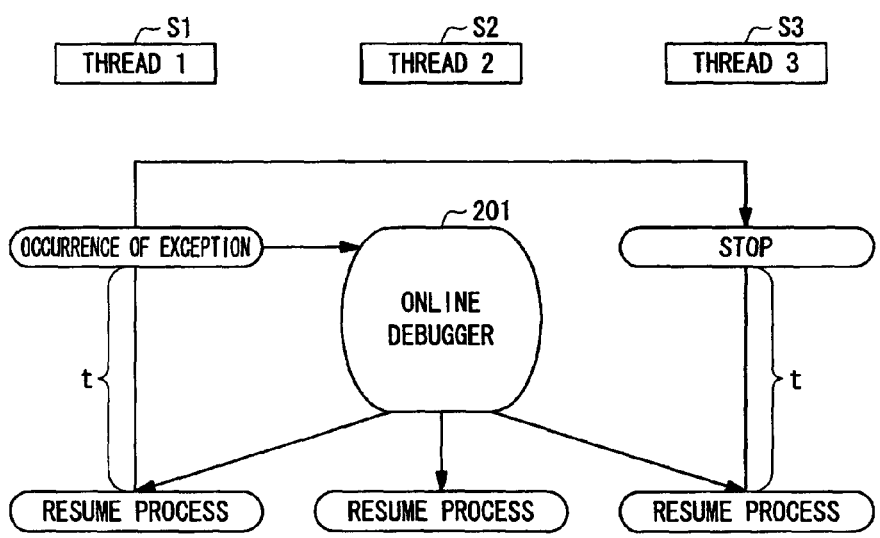
FIG. 3 is an explanatory view showing the relationship between a plurality of threads and an online debugger performed on a multiprocessor according to the first mode for embodying the present invention.

FIG. 3 is an explanatory view showing the relationship according to the first mode for embodying the present invention between s plurality of threads being executed on a multiprocessor and a nonline debugger. In the first mode for embodying the present invention, as shown in FIG. 3, the online debugger 201 performs a debugging process in a unit processor other than the unit processor executing a thread in which exception handling occurs.

That is, in the example shown in FIG. 3, a thread 1 (thread S1), a thread 2 (thread S2), and a thread 3 (thread S3) are executed on a multiprocessor. In the first mode for embodying the present invention, an exception occurs in software in the thread S1, and the online debugger 201 is activated in the thread S2.

The thread S2 activates the online debugger 201 upon occurrence of an exception, stops the thread S1 and the thread S3, and also stops the thread itself. The online debugger 201 executes the online debugging after awaiting the stop of the processors executing the threads S1 and S3. The online debugger 201 refers to the information recorded in the status register, etc. of the threads S1 and S3, and grasps the statuses of a plurality of threads in the break point.

After the termination of the operation of the online debugger, the online debugger 201 resumes the processing in the threads S1, S2, and S3. A unit processor executing the thread S1 and a unit processor executing the thread S3 are stopped in a period t up to the resumption of the process by the online debugger 201.

Figure 4:
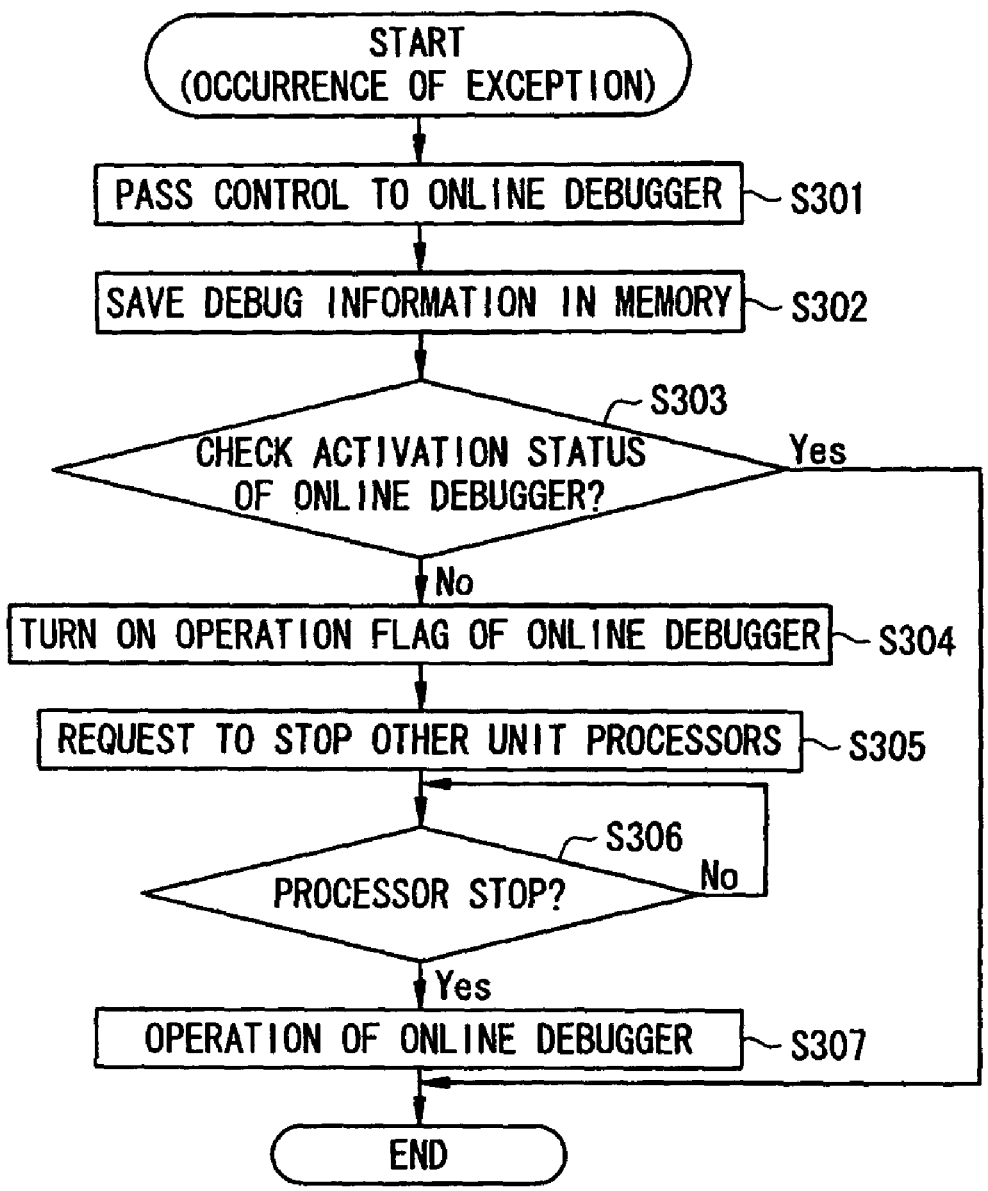
FIG. 4 is a flow chart for explanation of the program for directing a computer to perform the debug supporting method according to the first mode for embodying the present invention explanation by referring to FIG. 3.
Figure 5:
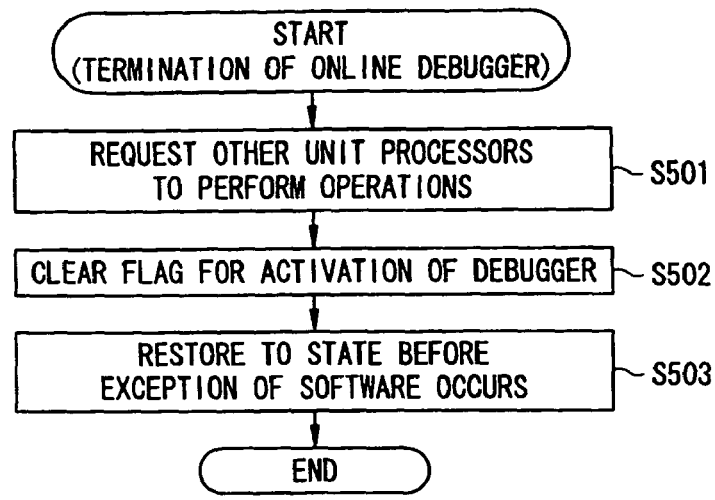
FIG. 5 is another flowchart for explanation of the program for directing a computer to perform the debug supporting method according to the first mode for embodying the present invention explanation by referring to FIG. 3.

FIGS. 4 and 5 are flowcharts for explanation of the program for direction g a computer to execute the debugging method according to the first mode for embodying the present invention explained by referring to FIG. 3. FIG. 4 shows the process from the break point to the execution of the online debugging. FIG. 5 is a flowchart for explanation of the program executed from the termination of the online debugging to the return to the processes prior to the occurrence of an exception.

The multiprocessor according to a mode for embodying the present invention is controlled by the online debugger 201 when a breakpoint is executed in any of the threads of the multiprocessor. The online debugger 201 is executed in any of the threads on the multiprocessor.

In the first mode for embodying the present invention, it is assumed that the online debugger 201 is operated using an available thread not being used in processing. The first mode for embodying the present invention has the effect that a thread and a unit processor for processing a thread can be effectively used.

Detecting an available thread can also be performed by, for example, the debug information check unit 204 of the online debugger 201 periodically checking the status registers R0 to R3 of the unit processors P0 to P3, and a status register detecting the unit processor whose status register enters a HALT state.

With the above-mentioned configuration, the debug information check unit 204 functions mainly as a unit processor selection section.

In the plurality of unit processors provided for the multiprocessor, when an exception of software occurs in one unit processor (unit processor P0), control of the threads being processed by another unit processor (unit processor P1) in the HALT state is passed to the online debugger 201 (S301).

The unit processor P1 saves in the register area of the management area 106 the information stored in the status register R1 or the program counter (not shown in the attached drawings), etc. (S302). Then, it is determined whether or not the online debugger 201 has been activated (S303). The determination is performed by referring to the activation flag written to the activation flag area of the management area 106.

When the activation flag indicates that the online debugger has been activated (YES in S303), then the online debugger 201 stops the processing.

If the online debugger 201 has not been activated (YES in S303), a flag indicating that the online debugger 201 has been activated is written to the activation flag area (S304). The interrupt control unit 203 performs interrupt processing on the unit processors (other processors) than the unit processor P1, and requests stopping the processes (S305). Then, by referring to the status registers of the unit processors p0, P2, and P3, it is determined whether or not the unit processors P0, P2, and P3 have been stopped (S306).

If it is determined, as a result of the determination in step S306, that the unit processors P0, P2, and P3 have been stopped (YES in S306), then the online debugger 201 performs the debugging processing in the unit processor P1 (S307).

As shown in FIG. 5, after the termination of the debugging process, the online debugger 201 requests the unit processors P0, P2, and P3 to perform (resume) the operations (S501). Then, the activation flag written to the activation flag area is cleared (S502). Furthermore, the unit processor P1 is restored to the status before the occurrence of the exception of software by, for example, restoring the saved debug information, etc. to the status register R1 (S503).

In the above-mentioned first mode for embodying the present invention, the plurality of unit processors P0 to P3 in the multiprocessor are simultaneously stopped in a single process when exception handling occurs, and the information about each unit processor can be detected. Therefore, a plurality of unit processors in the multiprocessor can be stopped substantially simultaneously, and the status of each processor when a break point occurs can be grasped. Since a plurality of unit processors can be stopped in a single process in the first mode for embodying the present invention, the process of stopping unit processors can be efficiently performed.

Furthermore, in the first mode for embodying the present invention, the execution of a thread is stopped by performing interrupt processing on the unit processors P0 to P1. Therefore, a thread can be stopped immediately upon the occurrence of an exception. The first mode for embodying the present invention can further enhance the efficiency of the process of stopping a plurality of unit processors.

(Second Mode for Embodying the Present Invention)

Next, the second mode for embodying the present invention is explained below. The debug support device according to the second mode for embodying the present invention has a configuration similar to the configuration of the debug support device executed by referring to the first mode for embodying the present invention. Therefore, a part of the explanation of the configuration and the figures of the debug support device of the second mode for embodying the present invention is omitted.

The debug support device according to the second mode for embodying the present invention is different from the device according to the first mode for embodying the present invention in that the online debugger performs the debugging process in the unit processor executing the thread in which the exception handling occurs.

Figure 6:
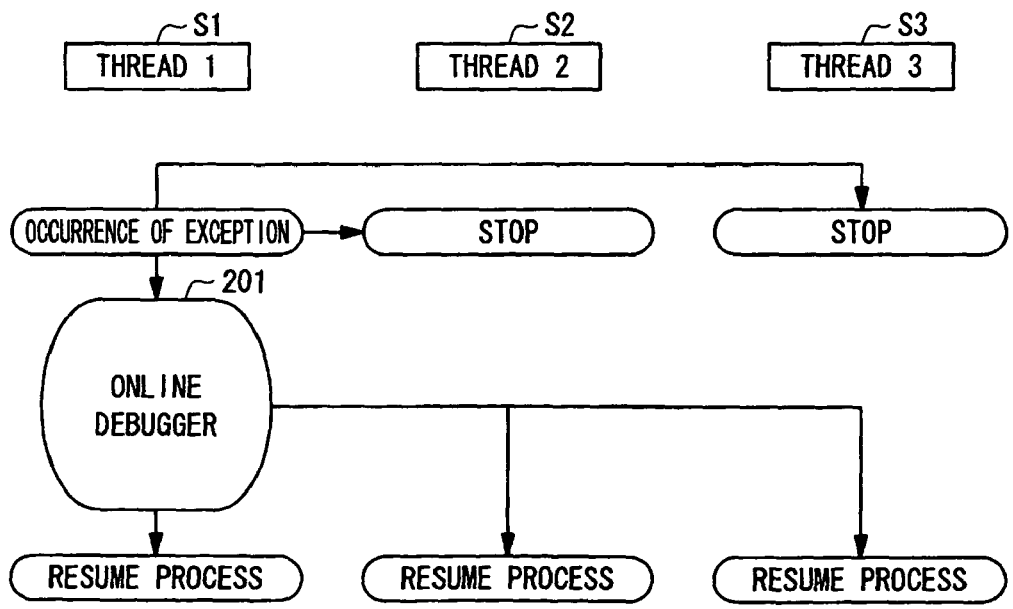
FIG. 6 is an explanatory view showing the relationship between a plurality of threads and an online debugger performed on a multiprocessor according to the second mode for embodying the present invention.

FIG. 6 is an explanatory view for explanation of the relationship between a plurality of threads being executed on a multiprocessor and the online debugger according to the second mode for embodying the present invention. In the second mode for embodying the present invention, as shown in FIG. 6, the online debugger 201 performs the debugging process on the unit processor executing the thread in which exception handling occurs.

That is, in the example shown in FIG. 6, the thread 1 (thread S1), the thread 2 (thread S2), and the thread 3 (thread S3) are executed on a multiprocessor. In the example shown in FIG. 6, an exception of software occurs in the thread S1, and the online debugger 201 is activated in the thread S1.

The thread S1 activates the online debugger 201 by an occurrence of an exception, stops the threads S2 and S3, and also stops itself. The online debugger 201 executes the online debugging after awaiting the stop of the processors executing the threads S2 and S3. The online debugger 201 refers to the information recorded in the status register, etc. of the threads S2 and S3, and grasps the statuses of a plurality of threads in the break point.

After the termination of the operation of the on line debugger, the online debugger 201 resumes the processing in the threads S1, S2, and S3. A unit processor executing the thread S2 and a unit processor executing the thread S3 are stopped in a period up to the resumption of the process by the online debugger 201.

Figure 7B:
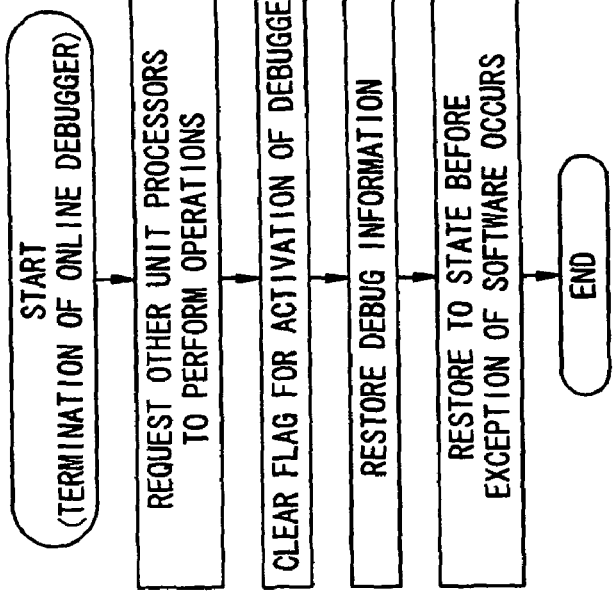
FIGS. 7A and 7B are flowcharts for explanation of the program for directing a computer to perform the debugging support system according to the second mode for embodying the present invention.
Figure 7A:
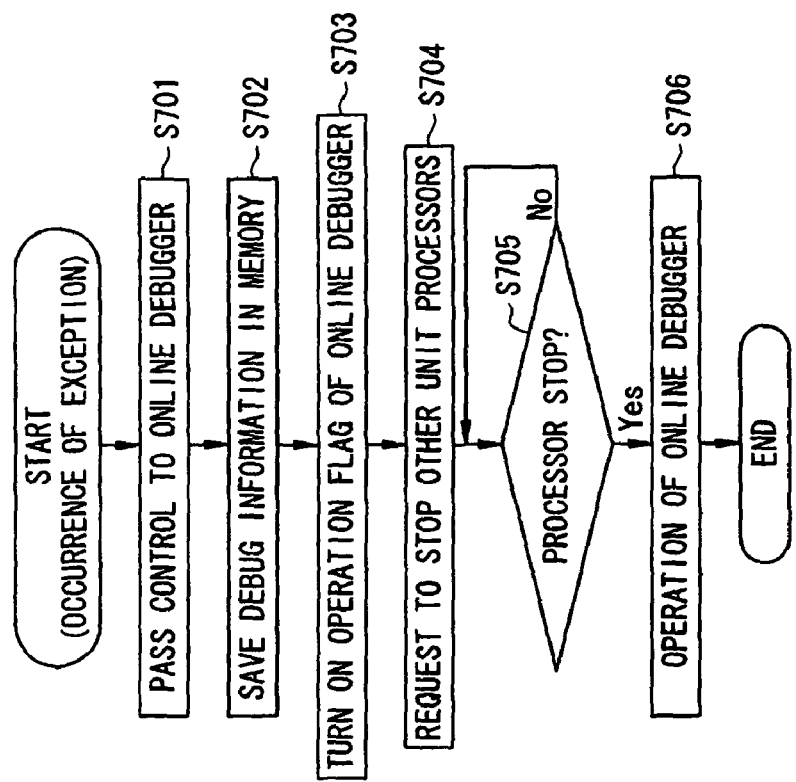

FIGS. 7A and 7B, and 8A and 8B are flowcharts for explanation of the program used to direct a computer to perform the debugging method according to the second mode for embodying the present invention explained by referring to FIGS. 6. FIG. 7A shows the process from the break point of a unit processor (unit processor P0) in which an online debugger is activated to the execution of the online debugging. FIG. 7B is a flowchart, in the unit processor P0, for explanation of a program executed from the termination of the online debugging to the return to the process before the occurrence of an exception.

Figure 8A:
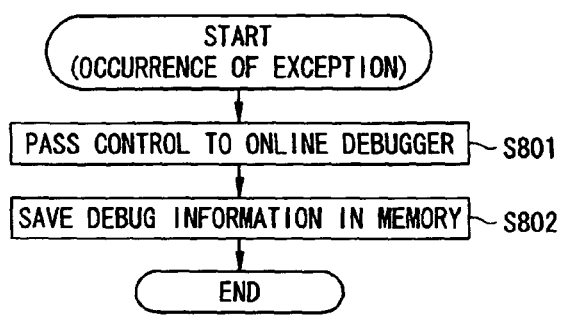
FIGS. 8A and 8B are another flowcharts for explanation of the program for directing a computer to perform the debugging support system according to the second mode for embodying the present invention.
Figure 8B:
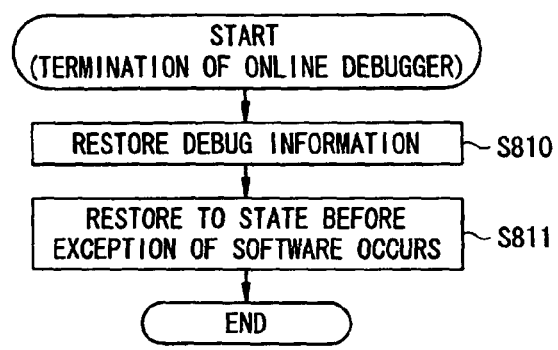

FIG. 8A shows a process from the break point of the unit processors P1 to P3 other than the unit processor P0 to the k execution of the online debugging. FIG. 8B is a flowchart for explanation of the program executed from the termination of the online debugging to the return to the process before the occurrence of an example in the unit processors P1 to P3.

When an exception of software occurs in the unit processor P0, control of the thread performed in the unit processor P0 is passed to the online debugger 201 (S701).

The online debugger 201 saves in the register area of the management area 106 the information stored in the status register R0, the program counter (not shown in the drawings), etc. (S702). Then, a flag indicating that the online debugger 201 is activated is written to the activation flag area (S703). The interrupt control unit 203 performs the interrupt processing on the unit processors (other processors) other than the unit processor P0, and requests to stop the processes (S704). Then, it is determined by referring to the status registers of the unit processors P1, P2, and P3 whether or not the unit processors P1, P2, and P3 have been stopped (S705).

If it is determined as a result of the determination in thread S705 that the unit processors P1, P2, and P3 have been stopped (YES in S705), the online debugger 201 performs the debugging operation in the unit processor P0 (S706).

As shown in FIG. 7B, after the termination of the debugging process, the online debugger 201 requests the unit processors P1, P2, and P3 to perform (resume) the operations (S710). Then, the activation flag written to the activation flag area is cleared (S711). Furthermore, the unit processor P0 is restored to the status before the occurrence of the exception of software by, for example, restoring the saved debug information, etc. to the status register R0 (S713).

The unit processors P1 to P3 other than the unit processor P0 are stopped by the online debugger 201 as shown in FIG. 8A. After the stop, control of the unit processors P1 to P3 is passed to the online debugger 201 (S801). Then, the online debugger 201 saves the information stored in the status register R0, program counter (not shown in the drawings), etc. in the register area of the management area 106 (S802), thereby terminating the process.

As shown in FIG. 8B, after the termination of the debugging process in the unit processor P0, the unit processors P1 to P3 restores the debug information, etc. in the status registers R1 to R3 at a request of the online debugger 201 (S810). In this process, the unit processors P1 to P3 are restored to the state before the exception of software occurs (S811).

The second mode for embodying the present invention selects the unit processor not used in processing a thread as a unit processor to be used in performing the debugging process. Therefore, the number of threads stopped in a debugging process can be reduced, the time required to perform the debugging process can be shortened, and the efficiency of the debugging process can be enhanced.

The program for directing a computer to perform the debugging method shown in FIGS. 4 to 6, 7A and 7B, and 8A and 8B is recorded and provided in a computer-readable recording medium such as CD-ROM, a floppy (registered trademark) disk (FD), a DVD, etc. in a file in a format that can be installed or executed. The program for directing a computer to execute the debugging method according to a mode for embodying the present invention can be stored in a computer connected to a network such as the Internet, etc., and can be provided by downloading it over the network. Furthermore, the program for directing a computer to execute the debugging method according to a mode for embodying the present invention can be recorded and provided in a computer-readable memory device such as ROM, flash memory, a memory card, a USB connected flash memory, etc.

What is claimed is:

1. A debug support device for debugging a multiprocessor configured by a first, a second, and a third unit processors, comprising:
a debug unit processor selecting section for detecting the second unit processor being in a HALT state by periodically checking a status register of the first, the second, and the third unit processors;
a unit processor stop section activated by the second unit processor being in the HALT state detected by the debug unit processor selecting section when execution of a thread reaches a breakpoint which is set in the thread executed on the first unit processor and invokes exception handling, for issuing an instruction of stopping execution threads executed on the first and the third unit processors to stop the execution of the first and the third unit processors substantially simultaneously; and
a debugging execution section for detecting information about the first, the second, and the third unit processors of which execution is stopped by the unit processor stop section, and for performing debug handling on the second unit processor being in the HALT state after the execution of the first and the third unit processors are stopped.

2. The debug support device according to claim 1, wherein the debugging execution section performs said debugging process in the unit processor executing the thread in which the stop of the execution of a thread occurs.

3. The debug support device according to claim 1, wherein the debugging execution section performs said debugging process in the other unit processors than the unit processor executing the thread in which the stop of the execution of a thread occurs.

4. The debug support device according to claim 3, further comprising
a unit processor selection section for selecting a unit processor for use in performing said debugging process by the debugging execution section, wherein
the unit processor selection section selects a unit processor not being used in thread processing.

5. A non-transitory computer-readable storage medium storing a program for directing a computer to execute a debugging method applied to a debug support device for debugging a multiprocessor configured by a first, a second, and a third unit processors, comprising:
a debut unit processor selecting step of detecting the second unit processor being in a HALT state by periodically checking a status register of the first, the second, and the third unit processors;
a unit processor stopping step of being activated by the second unit processor being in the HALT state detected by the debug unit processor selecting step when execution of a thread reaches a break point which is set in the thread executed on the first unit processor and invokes exception handling, for issuing an instruction of stopping execution threads executed on the first and the third unit processors to stop the execution of the first and the third unit processors substantially simultaneously; and
a debugging execution step of detecting information about the first, the second, and the third unit processors of which execution is stopped by the unit processor stop step, and for performing debug handling on the second unit processor being in the HALT state after the execution of the first and the third unit processors are stopped.

6. A debug support device for debugging a multiprocessor configured by a first, a second, and a third unit processors, comprising:
a unit processor stop section activated by the second unit processor being in the HALT state detected by a debug unit processor selecting section when execution of a thread reaches a breakpoint which is set in the thread executed on the first unit processor and invokes exception handling, for issuing an instruction of stopping execution threads executed on the first and the third unit processors to stop the execution of the first and the third unit processors substantially simultaneously; and
a debugging execution section for detecting information about the first, the second, and the third unit processors of which execution is stopped by the unit processor stop section, and for performing debug handling on the second unit processor being in the HALT state after the execution of the first and the third unit processors are stopped, wherein
the unit processor stop section comprises an interrupt control unit for performing interrupt processing on the unit processors by referring to an interrupt table for management of interrupt processing in accordance with an interrupt order to perform the stop of a thread.

7. A non-transitory computer-readable medium storing a program for directing a computer to execute a debugging method applied to a debug support device for debugging a multiprocessor configured by a first, a second, and a third unit processors, comprising:
a unit processor stopping step of being activated by the second unit processor being in the HALT state detected by a debug unit processor selecting section when execution of a thread reaches a breakpoint which is set in the thread executed on the first unit processor and invokes exception handling, for issuing an instruction of stopping execution threads executed on the first and the third unit processors to stop the execution of the first and the third unit processors substantially simultaneously; and
a debugging execution step of detecting information about the first, the second, and the third unit processors of which execution is stopped by the unit processor stop section, and for performing debug handling on the second unit processor being in the HALT state after the execution of the first and the third unit processors are stopped,
the unit processor stopping step comprises an interrupt control step for performing interrupt processing on the unit processors by referring to an interrupt table for management of interrupt processing in accordance with an interrupt order to perform the stop of a thread.

* * * * *